United States Patent [19]

Koshelev et al.

[11] 4,212,042
[45] Jul. 8, 1980

[54] DEVICE FOR RECOVERING VIDEO INFORMATION FROM MAGNETIC TAPE

[76] Inventors: Alexandr G. Koshelev, Leninsky prospekt, 189, kv. 87; Svyatoslav D. Kretov, Leninsky prospekt, 153, kv. 59; Konstantin A. Lavrentiev, ulitsa Kutsygina, 6, kv. 97, all of Voronezh, U.S.S.R.

[21] Appl. No.: 971,032

[22] Filed: Dec. 19, 1978

[30] Foreign Application Priority Data

Dec. 28, 1977 [SU] U.S.S.R. .................. 2555851

[51] Int. Cl.$^2$ .................. G11B 5/52; G11B 15/12
[52] U.S. Cl. .................. 360/108; 360/64; 360/84; 360/130.24
[58] Field of Search .................. 360/108, 130.22, 130.23, 360/130.24, 61, 64, 84

[56] References Cited

U.S. PATENT DOCUMENTS 4,031,558  6/1977  Kusaka .................. 360/108

FOREIGN PATENT DOCUMENTS 927308  5/1963  United Kingdom .................. 360/108
532289  10/1976  U.S.S.R. .................. 360/108

Primary Examiner—Alfred H. Eddleman
Attorney, Agent, or Firm—Fleit & Jacobson

[57] ABSTRACT

A device for recovering video information from magnetic tape, which comprises a magnetic head assembly arranged within a current-carrying casing in a manner allowing rotation of the magnetic heads with a hollow shaft. The magnetic heads are electrically coupled to the winding of a slip-ring rotor. A closed three-dimensional coupling turn couples the rotor winding to the winding of a slip-ring stator. The stator winding is electrically coupled to a reproduction amplifier through a step-up transformer and a first reproduction signal correcting circuit. The output of the reproduction amplifier is connected to a second reproduction signal correcting circuit inductively coupled to a short-circuited turn which is partly arranged within the current-carrying casing. The short-circuited turn has a lower inductance as compared to the closed three-dimensional coupling turn.

7 Claims, 3 Drawing Figures

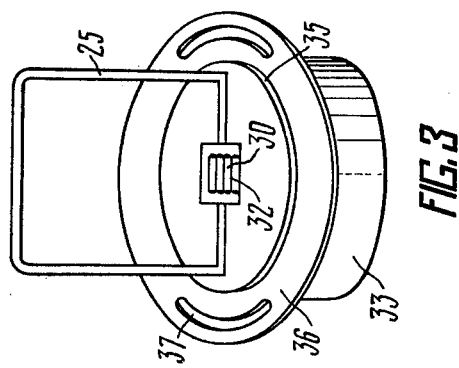
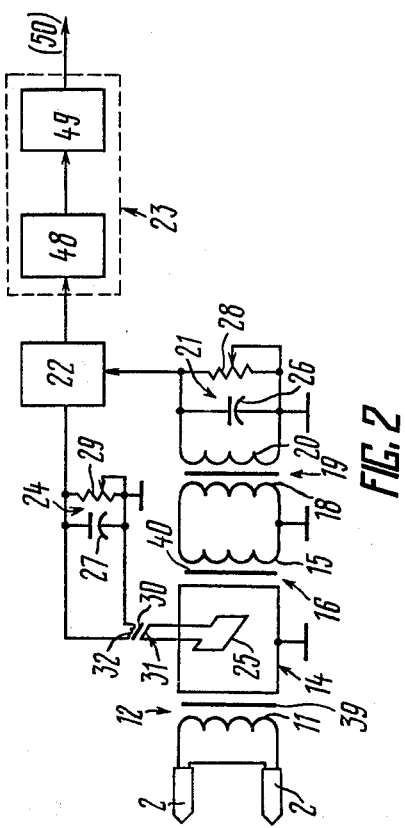

DEVICE FOR RECOVERING VIDEO INFORMATION FROM MAGNETIC TAPE

FIELD OF THE INVENTION

This invention relates to reproducing devices for video tape recorders and in particular to devices for recovering video information from magnetic tape.

It can be used to advantage in video tape recorders.

DESCRIPTION OF THE PRIOR ART

Known in the prior art is a device for recovering video information from magnetic tape by the use of magnetic heads arranged within a current-carrying casing of a magnetic head assembly in a manner allowing rotation thereof with a shaft, wherein the magnetic heads are electrically coupled to a slip-ring rotor winding which is coupled to a slip-ring stator winding electrically coupled through a step-up transformer and a reproduction signal correcting circuit to a reproduction amplifier, the output of which is connected to a subsequent reproduction signal shaping channel (cf. Funk-Technick Nos 8 through 13, 1970, for a description of the reproducing device of the LDL-1000 Philips video tape recorder).

In such a device, the cores of a slip-ring rotor and stator employing open magnetic circuits in the form of cup-like ferrite discs are arranged to be coaxial and parallel to each other and are spaced approximately 100 μm apart, whereas the windings of the slip-ring rotor and stator use flat spirals having coaxial turns and magnetically coupled to each other through the gap between the cores. The correcting circuit uses an RC network connected to the step-up transformer and the reproduction amplifier input.

With this arrangement, a reproduction signal is picked off from magnetic tape by means of the magnetic heads and fed to the slip ring wherein the efficiency of reproduction signal transmission is dependent upon the magnitude and setting accuracy of the gap between the rotor and stator cores and upon the coefficient of magnetic coupling between the rotor and stator windings. Thereafter the reproduction signal is applied through the step-up transformer, correcting circuit, reproduction amplifier and the subsequent reproduction signal shaping channel to the input of a TV receiver. As this happens, the correcting circuit corrects amplitude-frequency characteristic of the reproduction signal (hereinafter referred to as reproduction signal correction) within a narrow frequency band of the operating range by varying impedance of an equivalent tuned circuit wherein inductance depends upon the inductance of the windings of the magnetic heads, slip ring and step-up transformer, capacitance upon the value of a capacitor placed in the correcting circuit and the input capacitance of the reproduction amplifier, and effective resistance upon the value of a resistor comprised in the RC network. The impedance of the equivalent tuned circuit is varied by adjusting the capacitance and resistance of the correcting circuit components.

In the aforementioned device, reproduction quality is inadequate since amplitude distortions are likely to occur in the form of spurious amplitude modulation of the reproduction signal which is being accounted for by low efficiency of reproduction signal transmission through the slip ring wherein the gap between the coaxial alignment of the rotor and stator cores comprising open magnetic circuits are to be adjusted to a high accuracy.

Furthermore, the aforesaid device has been open to the objection that its reproduction quality is impaired by possible frequency distortions of the reproduction signal. This limitation is due to the provision of only one RC network within the device that confines reproduction signal corrections to a relatively narrow frequency band of the operating range.

Also known in the art is a device for recovering video information from magnetic tape by the use of magnetic heads arranged within a current-carrying casing of a magnetic head assembly in a manner allowing rotation thereof with a hollow shaft, wherein the magnetic heads are electrically coupled to a slip-ring rotor winding which is electrically coupled through a closed three-dimensional turn to a slip-ring stator winding electrically coupled through a step-up transformer and a reproduction signal correcting circuit to a reproduction amplifier the output of which is connected to a subsequent reproduction signal shaping channel.(cf. for example, the device disclosed in the application Ser. No. 939,338 of the same Applicants earlier filed with the U.S. Patent Office and claiming the same priority).

In such a device, the cores of a slip-ring rotor and stator employing closed magnetic circuits in the form of cylindrical ferrite rings are spaced a certain distance apart, whereas the rotor and stator windings each use a three-dimensional spiral having the centres of turns thereof arranged on the circumference coincident with the midline of each of the closed magnetic circuits and are interconnected via a closed three-dimensional coupling turn. With this arrangement, the correcting circuit uses an RC network incorporating such adjusting elements as a trimmer capacitor and a variable resistor connected to the secondary of the step-up transformer and to the input of the reproduction amplifier.

In such a device for recovering video information from magnetic tape, the probability of amplitude distortions of the reproduction signal is reduced whereby a higher reproduction quality is ensured. This advantage is due to enhanced efficiency of reproduction signal transmission through the slip ring wherein the rotor and stator cores employ closed magnetic circuits and the rotor and stator windings are interconnected through the closed three-dimensional coupling turn.

However, frequency distortions of the reproduction signal are likely to occur within the aforesaid device, a limiting factor similar to that of the other prior art device. Stated differently, the provision of only one RC network confines reproduction signal corrections to a relatively narrow frequency band of the operating range.

SUMMARY OF THE INVENTION

It is an object of the present invention to provide a novel device for recovering video information from magnetic tape, wherein reproduction quality is increased due to the possibility of correcting amplitude-frequency characteristic of a reproduction signal within a wider frequency band of the operating range.

The foregoing and other objects of the invention are accomplished by that in a device for recovering video information from magnetic tape by the use of magnetic heads arranged within a current-carrying casing of a magnetic head assembly in a manner allowing rotation thereof with a hollow shaft, wherein the magnetic heads are electrically coupled to a slip-ring rotor winding which is coupled through a closed three dimensional coupling turn to a slip-ring stator winding electrically coupled through a step-up transformer and a primary reproduction signal correcting circuit to a reproduction amplifier the output of which is connected to a subsequent reproduction signal shaping channel, according to the invention, provisions are made for an additional reproduction signal correcting circuit connected to the output of the reproduction amplifier and for a short-circuited turn partly enclosed within the current-carrying casing and inductively coupled to the additional reproduction signal correcting circuit, the short-circuited turn having a lower inductance as compared to the closed three-dimensional coupling turn.

Preferably, a core with a winding should be used to inductively couple the short-circuited turn to the additional reproduction signal correcting circuit.

Advantageously, the core and the winding should be enclosed within a shield casing.

Preferably, the core should be made up as a closed magnetic circuit embracing a portion of the short-circuited turn arranged beyond the current-carrying casing.

Preferably, the portion of the short-circuited turn arranged beyond the current-carrying casing should be rigidly secured to the shield casing, said casing being arranged on the current-carrying casing in a manner allowing angular displacement thereof.

The device for recovering video information from magnetic tape, according to the invention, enables correction of amplitude-frequency characteristic of a reproduction signal within a wider frequency band of the operating range whereby the level of frequency distortions of the reproduction signal will be appreciably reduced and reproduction quality of the entire device will be increased.

DESCRIPTION OF DRAWINGS

The foregoing and other objects of the invention will become apparent from a consideration of a specific embodiment thereof, taken in conjunction with the accompanying drawings, wherein:

The invention will be described further with reference to the accompanying drawings, wherein:

Figure 1:
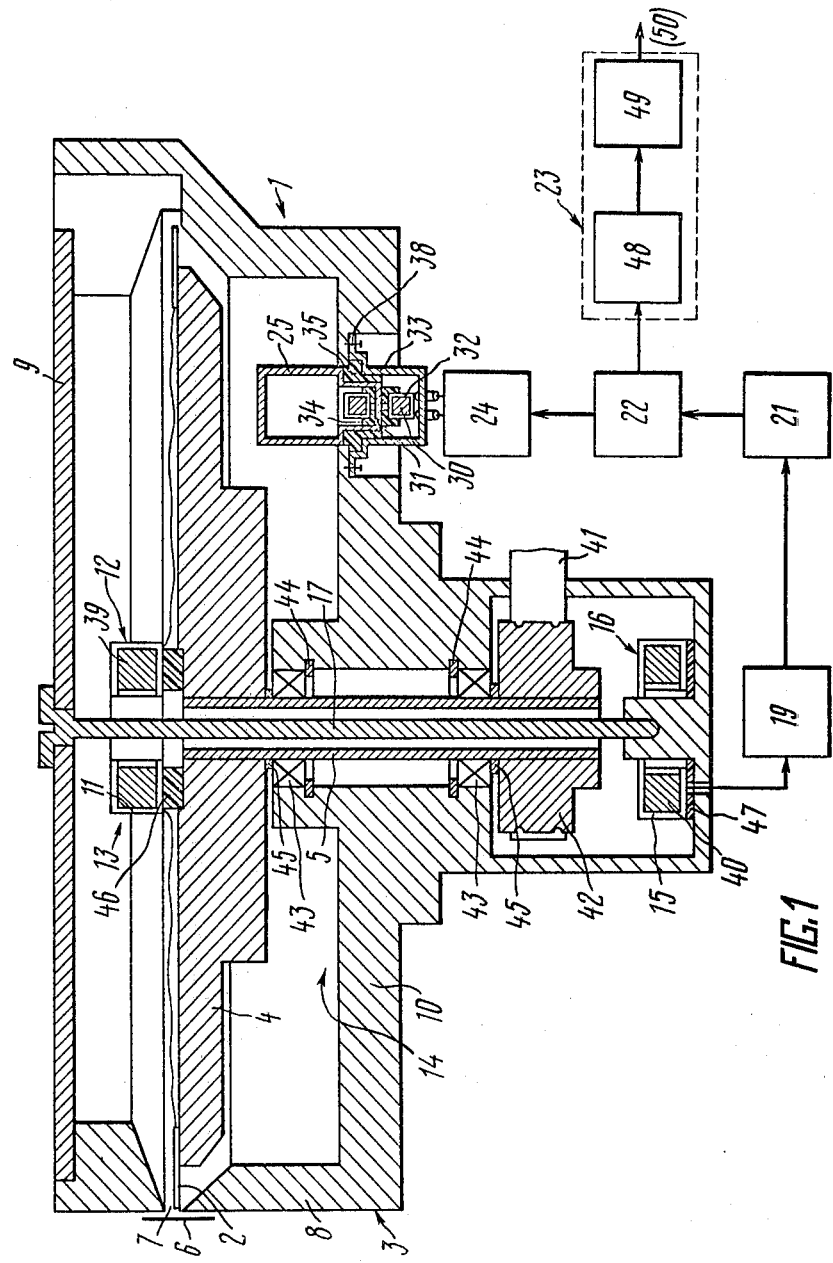

The foregoing and other objects of the invention will become apparent from a consideration of a specific embodiment thereof, taken in conjunction with the accompanying drawings.

FIG. 1 is a longitudinal sectional view of a device for recovering video information from magnetic tape according to the invention;

FIG. 2 is a circuit diagram of the device for recovering video information from magnetic tape shown in FIG. 1; and FIG. 3 is a general view of a short-circuited turn of the device shown in FIG. 1.

DESCRIPTION OF THE INVENTION

The device for recovering video information from magnetic tape according to the invention includes an assembly 1 (FIG. 1) comprising magnetic heads 2 arranged within a current-carrying casing 3 of the unit 1 in a manner allowing rotation thereof on a holder 4 secured to a hollow shaft 5 and coupling thereof to magnetic tape 6 through a slot 7 in one of walls 8 of the casing 3 having a cover 9 and a bottom 10. The magnetic heads 2 are electrically coupled to a winding 11 of a rotor 12 of a slip ring 13 arranged within the current-carrying casing 3. The winding 11 of the rotor 12 is coupled to a winding 15 of a stator 16 of the slip ring 13 through a closed three-dimensional turn 14. The closed three-dimensional turn 14 is formed with the cover 9, bottom 10, walls 8 of the current-carrying casing 3 and a current-carrying post 17 mounted within the shaft 5 and connected to the cover 9 and the bottom 10.

The winding 15 of the stator 16 is electrically coupled to a primary 18 (FIG. 2) of a step-up transformer 19 having a secondary 20 thereof electrically coupled to a reproduction signal correcting circuit 21 which, in its turn, is electrically coupled to the input of a widely known reproduction amplifier 22 (cf. Funk Technick Nos 10, 11, 1970) having one of outputs thereof connected to a widely known subsequent reproduction signal shaping channel 23 (cf. Funk Technick Nos 10, 11, 1970). The other output of the reproduction amplifier 22 is connected to another reproduction signal correcting circuit 24 which is inductively coupled to a short-circuited turn 25 (FIG. 1) partly enclosed within the current-carrying casing 3 and having a lower inductance as compared to the closed three-dimensional coupling turn 14.

The reproduction signal correcting circuits 21 (FIG. 2) and 24 use RC networks (herein after referred to as RC networks 21 and 24) comprising adjusting elements: trimmer capacitors 26, 27 and variable resistors 28, 29, respectively.

The short-circuited turn 25 (FIG. 1) is inductively coupled to the reproduction signal correcting circuit 24 through a core 30 comprising a closed magnetic circuit such, for instance, as a ferrite core member which embraces a portion 31 of the short-circuited turn 25 brought out of the casing 3 through the bottom 10 to be arranged beyond the current-carrying casing 3, and a winding 32 wound on the core 30 and connected to the circuit 24. The core 30 and the winding 32 are enclosed within a shield casing 33 and enclosed within a shield casing 33 and are insulated from the portion 31 of the short-circuited turn 25 by means of grommets 34.

The portion 31 of the short-circuited turn 25 being arranged beyond the current-carrying casing 3 is rigidly secured to the shield casing 33 by means of a grommet 35. The shield casing 33 is mounted on the current-carrying casing 3 from the side of its bottom 10 to enable angular displacement thereof. To this end, shaped slots 37 receiving screws 38 (FIG. 1) to be screwed into the body of the casing 3 are provided in a shoulder 36 (FIG. 3) of the shield casing 33 adjacent the casing 3.

In a preferred embodiment of the invention cores 39 and 40, respectively, of the rotor 12 and stator 16 of the slip ring 13 comprise closed magnetic circuits such, for instance, as ferrite core members and are spaced a certain distance apart. The windings 11 and 15, respectively, of the rotor 12 and stator 16 employ a three-dimensional spiral having the centres of turns thereof arranged on the circumference coincident with the midline of each of the closed magnetic circuits.

The shaft 5 is set in motion by means of a suitable drive (not shown in the drawings) which is kinematically coupled through a belt drive 41 to a pulley 42 fitted on the shaft 5 is supported by bearings 43 fixed with thrust rings 44 and pressed into place with washers 45.

The rotor 12 is arranged close to the cover 9 of the casing 3 on an insulating ring 46 secured to the holder 4.

The stator 16 is insulated from the bottom 10 of the casing 3 by means of an insulating ring 47 used together with the bottom 10 for bringing out of the casing 3 leads of the winding 15 of the stator 16, which are connected to the primary 18 (FIG. 2) of the step-up transformer 19.

The subsequent reproduction signal shaping channel 23 includes a limiting amplifier 48 with the input thereof connected to one of the outputs of the reproduction amplifier 22 and the output thereof connected to the input of a demodulator 49 the output of which is electrically coupled to a TV receiver 50 shown for convenience with reference numeral 50 in the drawing and not discribed since it forms no part of the present invention.

The device for recovering video information from magnetic tape according to the invention operates as follows.

The rotating magnetic heads 1 (FIG. 1) periodically interact with the magnetic tape 6 with the result that a reproduction signal is originated across the winding 11 of the rotor 12 of the slip ring 13 and induced through the closed three-dimensional coupling turn 14 and the winding 15 of the stator 16 of the slip ring 13, whence it is fed to the input of the reproduction amplifier 22 through the step-up transformer 19 and the correcting circuit 21.

The correcting circuit 21 performs primary correction of amplitude-frequency characteristic of the reproduction signal within a narrow frequency band of the operating range by varying impedance of an equivalent tuned circuit, wherein inductance depends upon the inductance of the windings (not shown in the drawings) of the magnetic heads 1 (FIG. 2), windings 11, 15 of the rotor 12 and stator 16 and the windings 18, 20 of the step-up transformer 19, capacitance upon the value of the trimmer capacitor 26 comprised in the correcting circuit 21 and the input capacitance of the reproduction amplifier 22, and effective resistance upon the value of the variable resistor 28 placed in the reproduction signal correcting circuit 21. The impedance of the equivalent tuned circuit is varied by changing the values of the adjusting elements: capacitance of the trimmer capacitor 26 and resistance of the variable resistor 28 placed in the correcting circuit 21.

The amplified reproduction signal is fed from the output of the reproduction amplifier 22 to the reproduction signal correcting circuit 24 effecting additional correction of amplitude-frequency characteristic of the reproduction signal (herein after referred to as reproduction signal correction) within a wider frequency band of the operating range as compared to the correction effected by the correcting circuit 21. Additional correction is accomplished by varing the impedance of the equivalent tuned circuit wherein inductance depends upon the inductance of the windings of the magnetic heads 1, winding 11, 15 of the rotor 12 and stator 16, and the windings 18, 20 of the step-up transformer 19, capacitance upon the values of the trimmer capacitors 26, 27 comprised in the correcting circuits 21, 24 and the input capacitance of the reproduction amplifier 22, and effective resistance upon the values of the variable resistors 28, 29 placed in the correcting circuits 21, 24. The impedance of the equivalent tuned circuit is varied by changing the values of the adjusting elements: capacitance of the trimmer capacitor 27 and resistance of the variable resistor 29 comprised in the correcting circuit 24.

A double-corrected reproduction signal is fed back through the winding 32 inductively coupled to the short-circuited turn 25 into the cavity of the current-carrying casing 3 (FIG. 1) which also accepts a reproduction signal from the closed three-dimensional coupling turn 14. Thereafter the resultant reproduction signal is applied to the input of the TV receiver 50 by way of the step-up transformer 29, correcting circuit 21, reproduction amplifier 22, and the subsequent reproduction signal shaping channel 23.

The short-circuited turn 25 is so arranged within the cavity of the current-carrying casing 3 relative to the closed three-dimensional coupling turn 14 that the coefficient of magnetic coupling between the short-circuited turn 25 and the closed three-dimensional coupling turn 14 equals a predetermined value. This is done by turning the shield casing 33 having the short-circuited turn 25 rigidly secured thereto through a desired angle in the plane of the bottom 10 of the casing 3.

The device for recovering video information from magnetic tape according to the invention ensures a higher reproduction quality thanks to a lower level of frequency distortions of a reproductions of a reproduction signal.

For clarity in description of a preferred embodiment of the invention, use has been made of specific terms. The invention is not, however, limited to the exact terms used inasmuch each term is understood to embrace all equivalent elements functioning in a similar manner and utilized for solving similar problems.

The preferred embodiment of the invention is illustrative of features of the invention only and in no wise is to be considered restrictive thereof as various changes in the details of construction and operation may be resorted to by those skilled in the art without departing from the range of the claims and the scope thereof.

What is claimed is:

1. A device for recovering video information from magnetic tape comprising:

an assembly including magnetic heads and having a current-carrying casing formed with a bottom, walls and a cover, said magnetic heads being arranged within said casing in a manner allowing rotation and coupling thereof to said magnetic tape through a slot in one of said walls;

a hollow shaft secured to said current-carrying casing and mounting said magnetic heads;

a slip ring enclosed within said casing and having a rotor and stator each of which includes a closed core and a winding wound on said core, said winding of said rotor being electrically coupled to said magnetic heads;

a current-carrying element arranged within said shaft and connected to said bottom and said cover so that the current-carrying element, said cover, said walls and said bottom form a closed three-dimensional turn coupling said windings of said rotor and said stator;

a step-up transformer electrically coupled to said winding of said stator;

a first reproduction signal correcting circuit electrically coupled to said step-up transformer;

a reproduction amplifier having an input and an output, said input being connected to the first reproduction signal correcting circuit;

a second reproduction signal correcting circuit connected to said output of said reproduction amplifier;

a short-circuited turn consisting of a first and a second portion, the first portion of said turn being arranged within said current-carrying casing and the second portion thereof arranged beyond said current-carrying casing, said short-circuited turn being inductively coupled to the second reproduction signal correcting circuit and having a lower inductance as compared to the closed three-dimensional coupling turn;

a subsequent reproduction signal shaping channel having an input connected to the output of said reproduction amplifier.

2. A device as claimed in claim 1, which includes a winding wound on said core, said core and said winding being used to inductively couple said short-circuited turn to the second reproduction signal correcting circuit.

3. A device as claimed in claim 2, which includes a shield casing containing the core with said winding.

4. A device as claimed in claim 2, wherein the core comprises a closed magnetic circuit embracing the second portion of said short-circuited turn.

5. A device as claimed in claim 3, wherein the core comprises a closed magnetic circuit embracing the second portion of said short-circuited turn.

6. A device as claimed in claim 4, wherein the shield casing is mounted on the current-carrying casing in a manner allowing angular displacement thereof; the second portion of the short-circuited turn being rigidly secured to said shield casing.

7. A device as claimed in claim 5, wherein the shield casing is mounted on the current-carrying casing in a manner allowing angular displacement thereof; the second portion of the short-circuited turn being rigidly secured to said shield casing.

* * * * *